United States Patent [19]

Selas et al.

[11] 4,303,147

[45] Dec. 1, 1981

[54] ADJUSTMENT FOR PNEUMATIC TIMER

[75] Inventors: George J. Selas, Milwaukee; John S. Hart, Racine, both of Wis.

[73] Assignee: Allen-Bradley Company, Milwaukee, Wis.

[21] Appl. No.: 895,728

[22] Filed: Apr. 12, 1978

[51] Int. Cl.[3] .......................... F16F 9/04; H01H 7/03

[52] U.S. Cl. .......................... 188/298; 116/277; 200/83 T; 335/61

[58] Field of Search .......................... 188/298; 116/277, 309; 200/34, 83 T; 335/61

[56] References Cited

U.S. PATENT DOCUMENTS

| | | | |
|---|---|---|---|
| 141,521 | 8/1873 | Starr | 116/277 |
| 982,195 | 1/1911 | Winkler | 116/277 |
| 2,220,590 | 11/1940 | Vogt | 116/309 |
| 3,019,317 | 1/1962 | Gauvreau | 200/34 |
| 3,213,333 | 10/1965 | Mikina et al. | 188/298 |
| 3,249,716 | 5/1966 | Haydu et al. | 335/61 |
| 3,538,321 | 6/1971 | Dennison | 200/83 T |
| 3,775,710 | 11/1973 | Cook | 335/61 |

FOREIGN PATENT DOCUMENTS

| | | |
|---|---|---|
| 506225 | 5/1939 | United Kingdom . |
| 568634 | 4/1945 | United Kingdom . |
| 589305 | 6/1947 | United Kingdom . |
| 741777 | 12/1955 | United Kingdom . |
| 1250432 | 10/1971 | United Kingdom . |

*Primary Examiner*—Edward R. Kazenske
*Attorney, Agent, or Firm*—Quarles & Brady

[57] ABSTRACT

An adjustment mechanism for a pneumatic timing device, that operates relay contacts with a time delay, in which a needle valve is aligned longitudinally with a bellows and the needle valve is operated by a rotatable adjustment knob that operates a visual indicator through a reduction gearing.

5 Claims, 4 Drawing Figures

ADJUSTMENT FOR PNEUMATIC TIMER

BACKGROUND OF THE INVENTION (a) Field of the Invention

The present invention relates to timer mechanisms for time delay relays, such as used in industrial control circuits for controlling motors, machinery, and manufacturing methods and systems. In the operation of control relays it is often desirable to delay the opening or closing of one or more sets of contacts after energizing or deenergizing the relay electromagnet. To accomplish the delay, a timer mechanism is used that has a timing function initiated upon an operation of the electromagnet, and the present invention relates to a pneumatic timer of this type.

(b) Description of the Prior Art

A typical form of pneumatic timing mechanism is shown in U.S. Pat. No. 3,249,716 issued May 3, 1966 and entitled "Time Delay Device". It contains a bellows with an operating button that cooperates with a set of levers for operating associated contacts. The bellows is held in a collapsed position until an associated electromagnet is either energized, or deenergized, at which time the bellows is free to expand at a timed rate. Upon completing its expansion, the bellows trips a contact actuating mechanism to obtain the desired time-delayed operation of associated relay contacts.

Air is admitted to the bellows through a needle valve that is adjusted in its position to control the period of delay for contact operation. To make an adjustment, the needle is moved lengthwise of itself, and by observing the axial position of the needle one has an indication of the time period for the delay in contact actuation. Such prior art construction requires the needle to be exposed for observation of its position, and a long linear scale is required for reading the position of adjustment of the needle. It is also a part of such construction to arrange the needle valve in a direction perpendicular to the bellows. This is necessary to accommodate the manually engageable adjustment member on the top of the device, where it may be readily manipulated whenever it is desired to reset the period of time delay.

SUMMARY OF THE INVENTION

The present invention resides in a pneumatic timing device having a needle valve which is moved along its axis, to obtain a time adjustment, by a manual operating member located at one end of the needle, such operating member being connected through a gear reduction to a rotatable visual indicator that turns at a slower rate than the manual operating member.

In a preferred form of the invention the needle valve is aligned longitudinally with its associated bellows and is telescoped into the bellows to obtain a reduction in the space requirements for the valve and bellows. This longitudinal alignment also positions the upper end of the needle valve at the top of the apparatus, so that a manually engageable adjustment member may be conveniently connected to the needle valve in a position where it may readily be manipulated.

A particular feature is the inclusion of a gear reduction between the manually engageable adjustment member and indicator which reads out the position of the needle valve. The amount of travel of the indicator need not match that of the adjustment member, so that the indicator can be conveniently confined in space. A particularly desirable arrangement is to have a rotatable indicator, as distinguished from linear scales in the prior art, which is concentric with the adjustment member. Then the indicator can be housed within the same diameter as that of the adjustment member.

It is an object of the invention to provide an adjustable time delay of the pneumatic type in which the movement of the adjustment member is reduced through a gear train to obtain a smaller total movement for a position indicator.

It is another object to reduce the size requirements of an adjustable pneumatic time delay mechanism for use in the operation of relay contacts.

It is another object to provide ease of adjustment for a time delay mechanism.

It is another object to provide a longitudinal alignment of the parts of a time delay mechanism that permits improved interfitting of parts.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is therefore made to the claims herein for interpreting the scope of the invention.

DESCRIPTION OF THE PREFERRED EMBODIMENT

Figure 1:
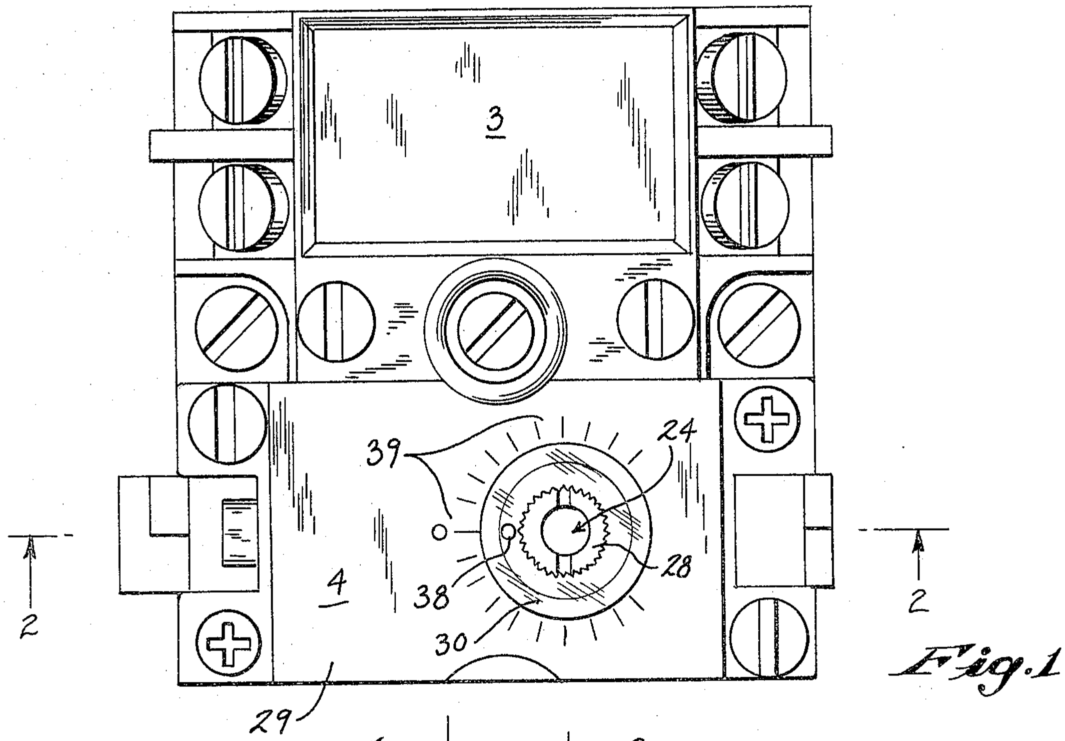
FIG. 1 is a top view of a time delay relay that incorporates a pneumatic timing device embodying the present invention.
Figure 2:
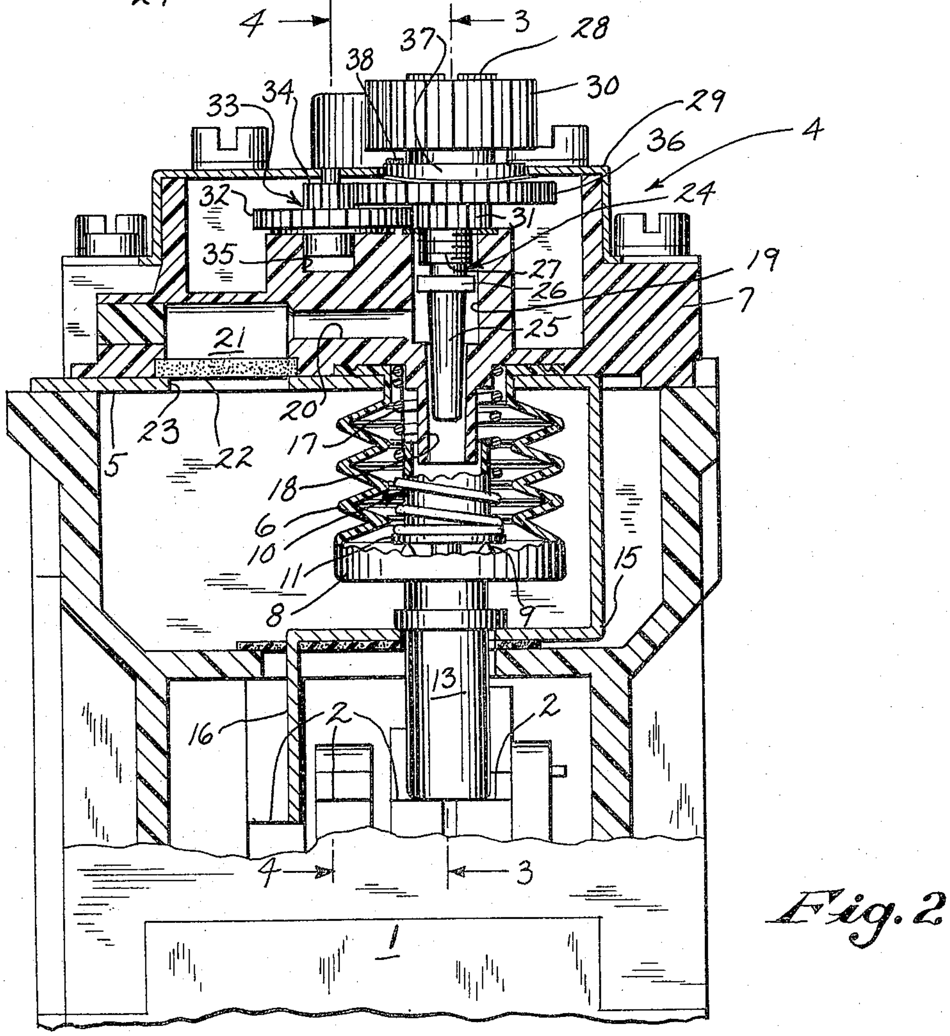
FIG. 2 is a vertical view in cross section of the time delay relay of FIG. 1 taken through the plane 2—2 which passes through the pneumatic timing device of the invention.

The time delay relay of FIGS. 1 and 2 is shown in FIG. 2 as sitting upon the top of an electromagnetic relay 1. Partially shown in the bottom of the time delay relay is a set of four levers 2 which respond to movement of an actuator within the electromagnetic relay 1. The levers 2, in turn, operate a set of contacts, not shown, that are housed beneath a cover 3 shown in FIG. 1. Movement of these contacts is time delayed, and adjacent the cover 3 is the pneumatic timing device 4 of the present invention which controls the amount of the delay. The internal construction of this timing device 4 is shown in section in FIGS. 2, 3 and 4. The construction and operation of the set of levers 2 and the contacts beneath the cover 3 are not a part of the present invention, and such mechanism is shown and described in the co-pending application of George J. Selas for Movement for Pneumatic Timer filed concurrently herewith.

As shown in FIG. 2, the pneumatic timing device 4 sits upon and closes over a cavity within the body of the time delay relay. There is a thin, horizontal mounting plate 5 with an opening through which a collapsible bellows 6 depends down into the cavity. An upper flange of the bellows 6 sits on the top of the mounting plate 5, and a gear and valve housing 7 of molded material having a complex configuration is bolted down onto the mounting plate 5 to hold the bellows 6 in position.

Figure 3:
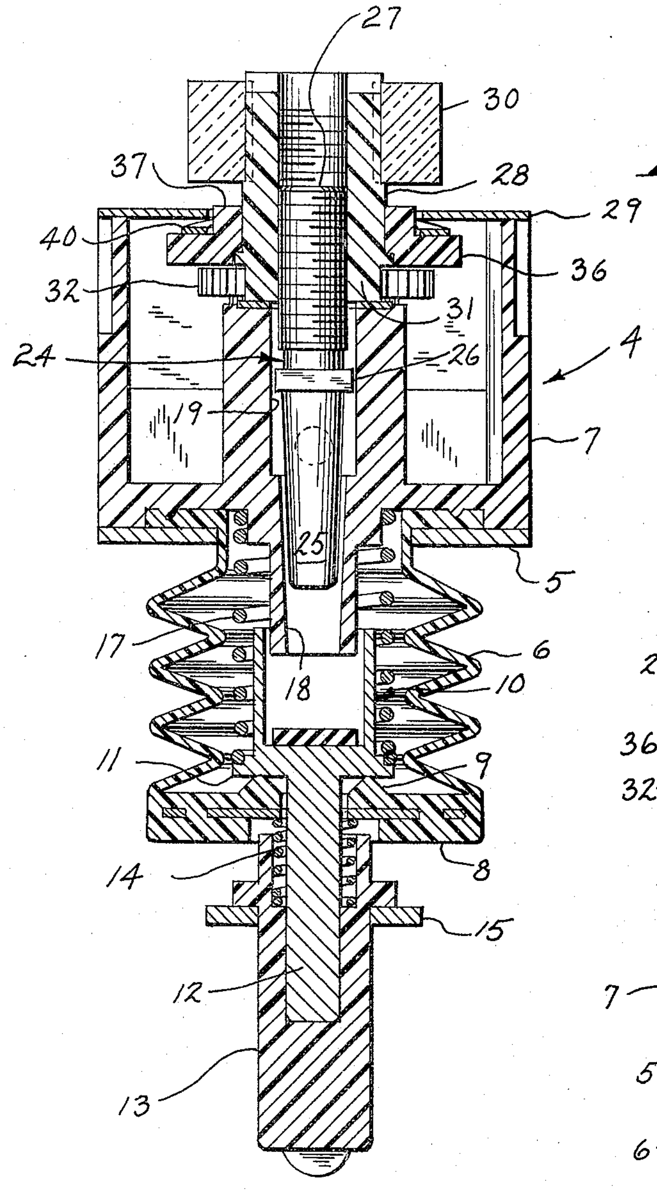
FIG. 3 is a vertical view in cross section of the pneumatic timing device of the invention taken through the plane 3—3 indicated in FIG. 2.
Figure 4:
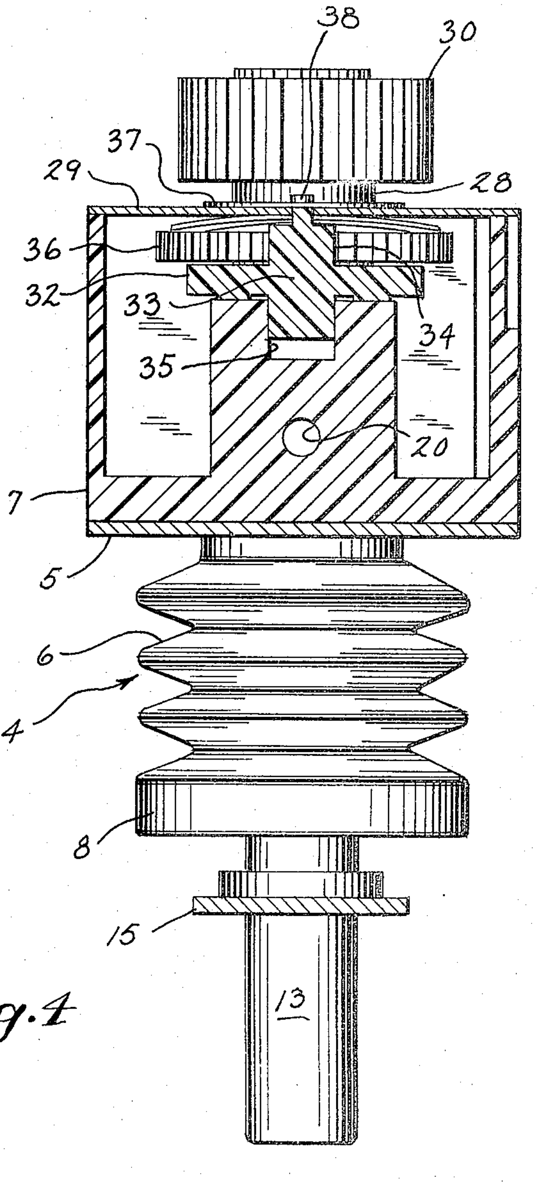
FIG. 4 is a view in vertical cross section of the pneumatic timing device of the invention taken through the plane 4—4 indicated in FIG. 2.

The construction of the interior of the bellows 6 is best seen in FIG. 3, and is similar to the bellows construction shown in U.S. Pat. No. 3,249,716 dated May 3, 1966. The base 8 of the bellows 6 is reinforced to present a firm bottom wall for the bellows. The upper surface of the base 8 has an annular, raised check valve seat 9 that surrounds an opening in the center of the base 8. Check valve member 10 has a cup shaped upper end housed within the bellows 6, a valve flange 11 that seats upon the valve seat 9, and a depending shaft 12 extending beneath the valve flange 11 which passes down through the bellows 6. An actuator button 13 is fastened firmly on the lower end of the shaft 12 for movement in unison therewith. The valve flange 11 normally seats upon the check valve seat 9, and a check valve spring 14 housed within the upper end of the actuator button 13 biases the bellows base 8 upwardly for a tight valve engagement.

Whenever the actuator button 13 is moved rapidly upward, in response to one of the levers 2, the bellows 6 will not necessarily collapse in unison with this upward movement, because of the pressure of the air entrapped therein. The spring 14 will then compress, and the check valve will open to permit air to rapidly escape from within the bellows 6. The bellows 6 can then readily collapse with the upward motion of the actuator button 13, so as not to impede the button 13 or the mechanism of which the levers 2 are a part.

The actuator button 13 is guided in its vertical motion by extending through an opening in a depending guide arm 15 that bends downwardly from and is an integral part of the mounting plate 5. As shown in FIG. 2, the guide arm 15 also has a downwardly extending finger 16 which blocks one of the levers 2 from being raised. This function of manipulation is not a part of the present invention, but is described in said co-pending application of George J. Selas filed concurrently herewith.

A bellows spring 17 is interposed between the valve flange 11 of the check valve 10 and the bottom of the housing 7 to urge the bellows 6 into its expanded position. The bellows 6 is held in its collapsed position by one of the levers 2, and when the lever 2 is moved out of the way, then the spring 17 can expand the bellows. The rate of expansion, however, is dependent upon admission of air into the bellows 6, for the spring 17 is not strong enough to overcome air pressure working against the bottom of the bellows base 8. By admitting air into the bellows 6 at a controlled rate of flow the downward movement of the actuator button 13 is controlled, and hence the delay in time at which the relay contacts will be operated is governed. An adjustable valve mechanism for controlling the rate of entry of air into the bellows 6 will next be described.

The gear and valve housing 7 has, as an integral part thereof, a tubular valve channel 18 extending downwardly into the bellows 6. The valve channel 18 has a slightly tapered opening which leads from a larger chamber 19 of rectangular cross section. As shown in FIG. 2, an air inlet duct 20 leads sidewardly off the chamber 19 to communicate with an air space 21 that has a filter 22 seated over an opening 23 in the mounting plate 5. Thus, air within the body of the time delay relay may flow through the filter 22 and into the bellows 6. This air is recirculated through the mechanism, rather than drawing upon the outside atmosphere.

A valve needle 24, which is shown in FIGS. 2 and 3, has a tapered stem 25 that extends into the valve channel 18, so that as the valve stem 25 is raised and lowered the size of the opening leading into the bellows 6 is altered to modify the rate of air flow into the bellows. Above the tapered stem 25 of the valve needle 24 is a rectangular flange 26 which matches the rectangular configuration of the chamber 19, so as to restrict the valve needle 24 from rotation. The upper end of the valve needle 24 is in the form of a threaded shaft 27 that is in threaded engagement with a central opening of an adjustment knob 28.

The knob 28 extends above a cover plate 29 which wraps around the top of the gear and valve housing 7 and which is bolted in place together with the housing 7 and the mounting plate 5 to have a unitary assembly fixed upon the body of the time delay relay. The upper end of the knob 28 includes a transparent collar 30 which is serrated around its periphery, to be grasped and turned to make adjustments of the valve needle 24. In this manner the time period of delay for operating relay contacts through the levers 2 is controlled. The valve needle 24 will move axially, but not rotationally, as the threads of the adjustment knob 28 are turned.

As shown in FIGS. 2 and 3, a small diameter driving gear 31 is formed as an integral part of the adjustment knob 28. This gear 31 is in mesh with a relatively large diameter intermediate gear 32. The gear 32 is part of an idler gear train member 33, best shown in FIGS. 2 and 4, which has a pinion gear 34 molded integrally with the gear 32. The gear train member 33 is borne at its lower end by a boss portion fitting within a bearing seat 35 forming a part of the housing 7. The upper end of the gear train member 33 has a small journal that turns in a mating opening in the cover plate 29.

The pinion 34 meshes with an output gear 36, which as shown in FIG. 3 encircles the adjustment knob 28. The output gear 36 rotates separately from the adjustment knob 28, at a rate dependent upon the gear reduction provided by the described gearing. The upper part of the gear 36 constitutes an indicator member 37 with a raised indicator button 38 (see FIGS. 1, 2 and 4) protruding above the cover plate 29. The position of the button 38 can be seen through the transparent collar 30, and a convenient scale 39 is provided on the surrounding surface of the cover plate 29 to give an indication of the time delay period for which the valve needle 24 is set.

A dished, annular spring 40 is interposed between the upper surface of the output gear 36 and the underside of the cover plate 29. The spring 40 provides an axial thrust upon the output gear 36 and the adjustment knob 28 to maintain the parts in position, and it also provides internal friction to restrain the knob 28 and the valve needle 24 from shifting out of adjustment.

The invention provides an improved adjustment for the time delay of a pneumatic timer relay utilizing an expanding bellows as the timing device. Ease of adjustment is provided by an exposed, manually operable, rotatable knob. The position of adjustment is indicated by an indicator fully protected within the knob. To achieve this result an annular portion of the knob is transparent, so that the position of the indicator can be viewed through the knob. This arrangement makes for a compact construction, in which the indicator can be fully confined within the periphery of the knob.

The invention also provides a gear reduction between the adjustment knob and the indicator, so that a large number of turns for the adjustment can be measured by an indicator that travels through its full range of movement within a circular arc. There is also provided an axial alignment of the bellows and the needle valve that permits a telescoping of a portion of the valve into the bellows interior to achieve space saving for a reduction in overall size of the timing apparatus.

A further aspect of the pneumatic timer mechanism is the use of a recirculating air system for the expandible bellows. The bellows fits within an enclosed cavity that supplies air through a filter to the needle valve. When the bellows is collapsed it returns the air to the cavity. Thus, an enclosed air circulatory system is employed which feeds filtered air through the needle valve to the bellows.

We claim:

1. In a position indicator for a pneumatic timing device, the combination comprising:

a rotatable adjustment member having a concentrically disposed drive gear at one end thereof;

a gear assembly having an axis laterally disposed from the axis of rotation of said adjustment member, with a large intermediate gear engaging said drive gear to be turned thereby and a small pinion gear attached in concentric arrangement to said intermediate gear for rotation therewith;

a valve with a valve housing and with a valve member that is coupled to said adjustment member, said valve member being adjusted in its position upon rotation of said adjustment member;

a cover member supported by said valve housing to close over said gear assembly and having an opening through which said adjustment member projects;

a position indicator rotatable relative to said adjustment member and encircling the same, said position indicator having a raised portion situated in said opening, said raised portion having a reference mark disposed thereon, and said position indicator also having an output gear portion engaging said small pinion gear within said cover member to be driven thereby; and a stationary timing scale arranged in an arc alongside said opening in the cover member to provide a time delay reading for a selected position of the reference mark on said raised portion of said position indicator.

2. The combination of claim 1, wherein said adjustment member forms a non-transparent portion of an adjustment knob, said adjustment knob also including a transparent portion surrounding said non-transparent portion and extending radially therefrom to overhang the periphery of said raised portion of the position indicator, said transparent portion terminating short of said timing scale, so that said reference mark but not said timing scale is viewed through said transparent portion.

3. The combination of claim 2, wherein said transparent portion of the adjustment knob forms an annular collar that is mounted on said adjustment member.

4. The combination of claim 1, further comprising a dished annular spring encircling said raised portion of the position indicator and interposed between said cover member and said depending output gear portion to hold said position indicator and said gear assembly in operating position.

5. The combination of claim 1, further comprising a bellows depending from said valve housing, wherein said valve housing forms an opening leading into and arranged longitudinally of said bellows, and wherein said valve member has one end that is longitudinally movable into said valve opening and has an opposite end around which said adjustment member and said position indicator rotate to provide a compact adjustment mechanism with a valve and a position indicator operating along a common axis.

* * * * *